US009947914B2

(12) United States Patent
Manka

(10) Patent No.: US 9,947,914 B2
(45) Date of Patent: Apr. 17, 2018

(54) BATTERY CLAMP CLEANING DEVICE

(71) Applicant: Snap-on Incorporated, Kenosha, WI (US)

(72) Inventor: David Manka, Kenosha, WI (US)

(73) Assignee: Snap-on Incorporated, Kenosha, WI (US)

( * ) Notice: Subject to any disclaimer, the term of this patent is extended or adjusted under 35 U.S.C. 154(b) by 449 days.

(21) Appl. No.: 14/624,141

(22) Filed: Feb. 17, 2015

(65) Prior Publication Data

US 2016/0240834 A1    Aug. 18, 2016

(51) Int. Cl.
*H01M 2/32* (2006.01)
*H01M 2/30* (2006.01)
*H01G 9/28* (2006.01)
*H01G 11/08* (2013.01)

(52) U.S. Cl.
CPC ............. *H01M 2/32* (2013.01); *H01M 2/305* (2013.01); *H01G 9/28* (2013.01); *H01G 11/08* (2013.01)

(58) Field of Classification Search
CPC .......... H01M 2/20; H01M 2/206; H01M 2/32; H01G 9/28
See application file for complete search history.

(56) References Cited

U.S. PATENT DOCUMENTS

| | | | |
|---|---|---|---|
| 289,879 A | 12/1883 | Almond | |
| 1,252,964 A | 1/1918 | Stafford | |
| 2,074,177 A | 3/1937 | Graul | |
| 2,121,307 A | 6/1938 | Swift | |
| 2,430,785 A | 11/1947 | Scattone | |
| 2,471,236 A | 5/1949 | Parker | |
| 2,734,320 A | 2/1956 | Hoye | |
| 2,763,968 A | 9/1956 | Burns | |
| 2,922,218 A | 1/1960 | Lewis | |
| 3,343,245 A | 9/1967 | Sylvester | |
| 3,982,357 A | 9/1976 | Eldridge et al. | |
| 4,011,693 A | 3/1977 | Eldridge, Jr. | |
| 4,011,944 A | 3/1977 | Cooley et al. | |
| 4,215,306 A | 7/1980 | Mace | |
| 4,439,884 A | 4/1984 | Giorni | |

(Continued)

FOREIGN PATENT DOCUMENTS

CN    1243904 A    2/2000
CN    2736443 Y    10/2005

(Continued)

OTHER PUBLICATIONS

United Kingdom Examination Report under Section 18(3) dated May 2, 2017, 2 pages.

(Continued)

*Primary Examiner* — Karie O'Neill Apicella
(74) *Attorney, Agent, or Firm* — Seyfarth Shaw LLP

(57) ABSTRACT

A battery pack unit is disclosed that includes an abrasive material or surface in a location where battery clamps of the battery pack unit are placed for storage. This provides for a surface where the battery clamps can be frictionally cleaned to remove unwanted corrosion or deposits from the battery clamps. This allows the cleaned battery clamps to be connected to terminals of a battery without experiencing a significant reduction in flow of current between the battery clamps and the terminals of the battery.

15 Claims, 7 Drawing Sheets

(56) References Cited

U.S. PATENT DOCUMENTS

| | | |
|---|---|---|
| 4,543,751 A | 10/1985 | Alikhan |
| 4,740,169 A | 4/1988 | Gordon |
| 4,934,949 A | 6/1990 | Charneski |
| 5,016,401 A | 5/1991 | Mangus |
| 5,082,111 A | 1/1992 | Corbitt, Jr. |
| 5,166,478 A | 11/1992 | Sprouse |
| 5,183,407 A | 2/1993 | Srol |
| 5,564,151 A | 10/1996 | Miller et al. |
| 5,589,292 A | 12/1996 | Rozon |
| 6,002,235 A | 12/1999 | Clore |
| 6,130,519 A | 10/2000 | Whiting et al. |
| 6,193,932 B1 | 2/2001 | Wu et al. |
| 6,215,273 B1 | 4/2001 | Shy |
| 6,222,342 B1 | 4/2001 | Eggert et al. |
| 6,259,228 B1 | 7/2001 | Becker et al. |
| 6,565,381 B1 * | 5/2003 | Chou ............ H01M 2/30 429/100 |
| 6,679,708 B1 * | 1/2004 | Depp ............ H01R 9/2466 361/752 |
| 6,779,620 B2 | 8/2004 | Taniguchi |
| 6,964,078 B2 | 11/2005 | Schwab |
| 7,252,558 B2 | 8/2007 | Cottle |
| 7,975,685 B2 | 7/2011 | Zhao |
| 8,296,893 B2 | 10/2012 | Vinci et al. |
| 8,465,594 B1 | 6/2013 | Harder |
| 8,505,748 B2 | 8/2013 | Jones et al. |
| 2008/0088275 A1 | 4/2008 | Lin |
| 2011/0300435 A1 | 12/2011 | Byun |
| 2014/0289980 A1 | 10/2014 | Vinci et al. |

FOREIGN PATENT DOCUMENTS

| | | |
|---|---|---|
| CN | 101232082 A | 7/2008 |
| CN | 102677813 A | 9/2012 |
| CN | 103170464 A | 6/2013 |

OTHER PUBLICATIONS

Australian Patent Examination Report No. 1 dated Aug. 17, 2016; 5 pages.

Taiwan Office Action for Application No. 105104402 dated May 31, 2017, 4 pages.

Taiwan Office Action for Application No. 105104402 dated Dec. 11, 2017, 7 pages.

Canadian Office Action for Application No. 2,920,212 dated Jan. 26, 2018, 5 pages.

* cited by examiner

US 9,947,914 B2

BATTERY CLAMP CLEANING DEVICE

FIELD

The present application relates generally to battery clamp cleaning devices and, more particularly, to an improved battery pack unit including battery clamp cleaning devices.

BACKGROUND

Currently, many battery chargers and battery jump packs, for example, for jump starting or charging a battery of a vehicle, are known and used. Typically, these devices are portable and include locations, such as posts, studs, or holsters, where battery clamps are clamped or placed for storage. During use, the battery clamps are removed from the posts, studs, or holsters and clamped onto terminals of a battery or other terminal locations to provide an electrical connection for charging and/or jump starting a vehicle.

During use and storage, however, the battery clamps or surfaces on the battery clamps that engage the terminals of the battery can oxidize or otherwise corrode or become dirty, forming a deposit on the battery clamps that can hinder electrical transmission. Likewise, the posts, studs, or terminals can also corrode or become dirty or corroded. This deposit may reduce the flow of current between the battery clamps and the terminals, thereby reducing the effectiveness or usefulness of such battery chargers and battery jump packs.

SUMMARY

The present application relates to a battery pack unit and/or battery charging unit, for example, for use in charging or jump starting a battery of an automotive or other type of vehicle. The battery pack unit and/or battery charging unit includes an abrasive material or surface in a location where battery clamps of the battery pack unit and/or battery charging unit are inserted or placed for storage. This provides for a surface where the battery clamps can be scrapped or otherwise frictionally cleaned while inserted or removed to remove unwanted deposits from the battery clamps. The cleaned battery clamps may then be connected to terminals of a battery without significant reduction in flow of current between the battery clamps and the terminals of the battery.

In an aspect, the present application relates to a battery clamp cleaning device including a storage structure into which the battery clamp is disposed for storage, and an abrasive surface disposed on the storage structure and interfacing with at least one of an upper or lower jaw of the battery clamp when the battery clamp is inserted into the storage structure, thereby frictionally removing any deposits on the clamp.

In another aspect, the present application relates to a battery pack unit. The battery pack unit includes a housing, an electrical source, such as a battery, capacitor, ultra-capacitor, or other source of electrical energy, disposed in the housing, a cable electrically coupled to a terminal of the electrical source and extending out of the housing, and a battery clamp electrically coupled to the cable exterior to the housing. In this aspect, the battery pack unit also includes a storage structure formed on the housing and into which the battery clamp is placed for storage, and an abrasive surface disposed on the storage structure and interfacing with at least one of an upper or lower jaw of the battery clamp when the battery clamp is placed on the storage structure.

In yet another aspect, the present application relates to a battery pack unit. The battery pack unit includes a housing and an electrical source, such as a battery, capacitor, ultra-capacitor, or other source of electrical energy, disposed in the housing. A first cable is electrically coupled to a first terminal of the electrical source and extends out of the housing, and a first battery clamp is electrically coupled to the first cable exterior to the housing. A second cable is electrically coupled to a second terminal of the electrical source and extends out of the housing, and a second battery clamp is electrically coupled to the second cable exterior to the housing. First and second storage structures are formed on the housing and configured to respectively receive the battery clamps for storage. First and second abrasive surfaces are also respectively disposed on the storage structures and interface with at least one of an upper or lower jaw of the respective first and second battery clamps, thereby frictionally removing any deposits.

BRIEF DESCRIPTION OF THE DRAWINGS

For the purpose of facilitating an understanding of the subject matter sought to be protected, there is illustrated in the accompanying drawing embodiments thereof, from an inspection of which, when considered in connection with the following description, the subject matter sought to be protected, its construction and operation, and many of its advantages should be readily understood and appreciated.

DETAILED DESCRIPTION

Figure 1:
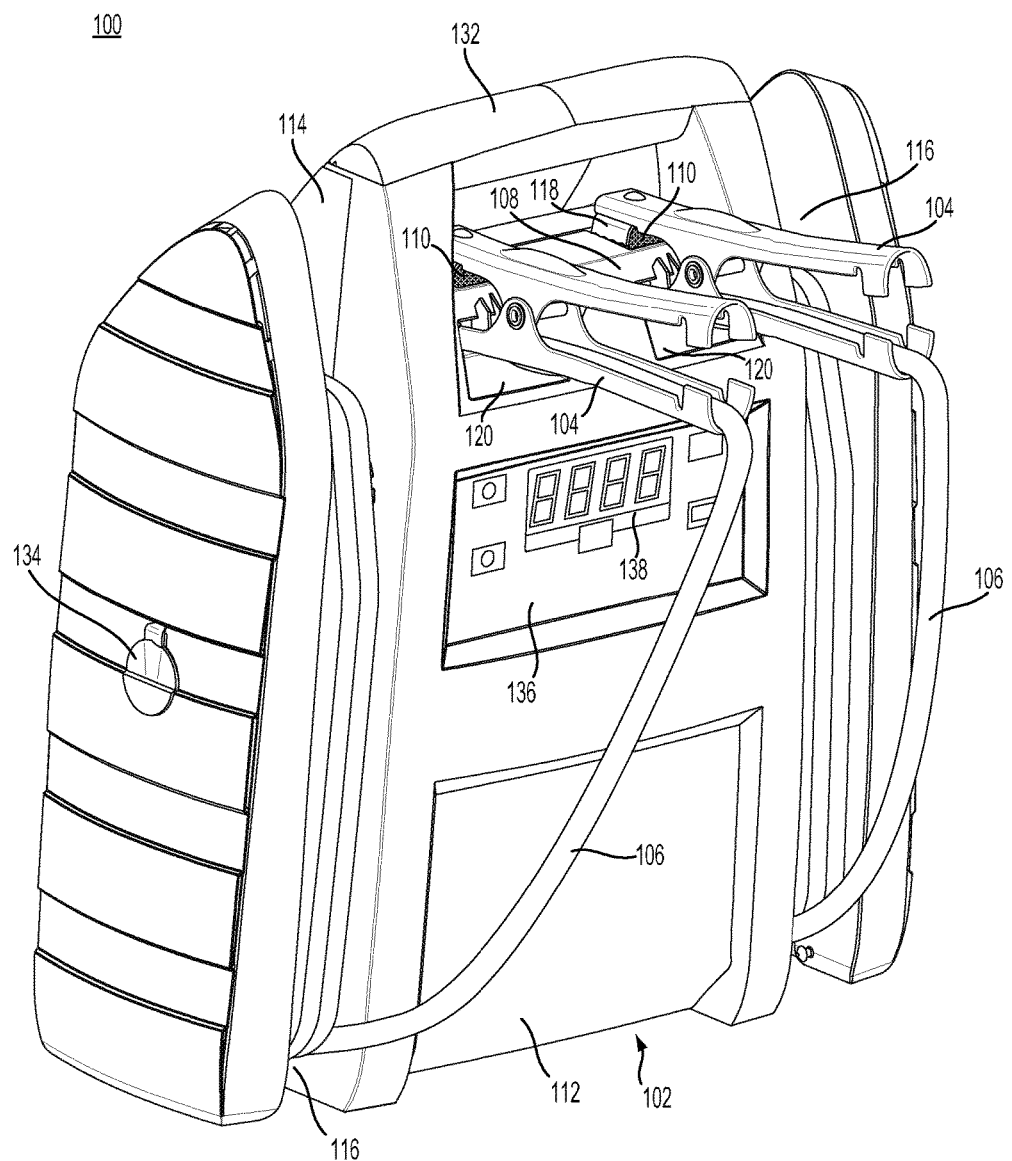
FIG. 1 illustrates a perspective front view of a battery pack according to aspects of the application.

While this application is susceptible of embodiments in many different forms, there is shown in the drawings and herein described in detail certain embodiments of the application with the understanding that the present application is to be considered as an exemplification, and is not intended to limit the broad aspect of the application to embodiments illustrated.

The present application discloses a battery pack unit and/or battery charging unit, for example, for use in charging or jump starting a battery of an automotive or other type of vehicle. The battery pack unit and/or battery charging unit includes an abrasive material or surface in a location where battery clamps of the battery pack unit and/or battery charging unit are placed for storage. This provides for a surface where the battery clamps can be scrapped or otherwise frictionally cleaned to remove unwanted deposits from the battery clamps. The cleaned battery clamps may then be connected to terminals of a battery without significant reduction in flow of current between the battery clamps and the terminals of the battery.

In an embodiment, a battery pack unit 100 is described with reference to FIGS. 1-5. Referring to FIG. 1, the battery pack unit 100 includes a housing 102, battery clamps 104 electrically coupled to corresponding positive and negative terminals of an electrical source, such as a battery, capacitor, ultra-capacitor, or other source of electrical energy, disposed in the housing 102 via electrical wiring or cables 106, and a storage area 108 formed in the housing 102 and including one or more abrasive surfaces 110.

The housing 102 includes a first housing portion 112 and a second housing portion 114 coupled to the first housing portion 112, for example, using an adhesive, interference fit, fasteners, or a combination thereof. The first and second housing portions 112, 114 may be of a clamshell-type housing configured to house an electrical source, circuit board (for example a printed circuit board (PCB)), resistor (s), capacitor(s), and other circuit components known in the art for providing a battery pack unit 100 of the type (as described in further detail below). The housing 102 may also include cable grooves 116 located on opposing ends of the housing 102 and formed to receive corresponding cables 106. These cable grooves 116 allow the cables 106 coupled to the corresponding battery clamps 104 to be wound, wrapped, or otherwise disposed in the cable grooves 116 for storage when the battery pack unit 100 is not in use.

The battery clamps 104 are electrically coupled to corresponding positive and negative terminals of the electrical source disposed in the housing 102 via the corresponding cables 106. The battery clamps 104 include jaws 118 that are biased together, as known in the art, for clamping respectively onto the corresponding positive and negative terminals of an associated battery (for example, a battery of an automotive or other type of vehicle) to be jump-started or charged.

The storage area 108 is formed in the first housing portion 112 and accommodates the battery clamps 104. Referring to FIGS. 1-4, the storage area 108 includes recesses 120 configured to receive a lower one of the jaws 118 of the corresponding battery clamps 104 and recesses 122 configured to receive an upper one of the jaws 118 of the corresponding battery clamps 104. A lip 124 is formed by recesses 120, 122 and the jaws 118 of the corresponding battery clamps 104 may be clamped onto the lip 124.

Figure 2:
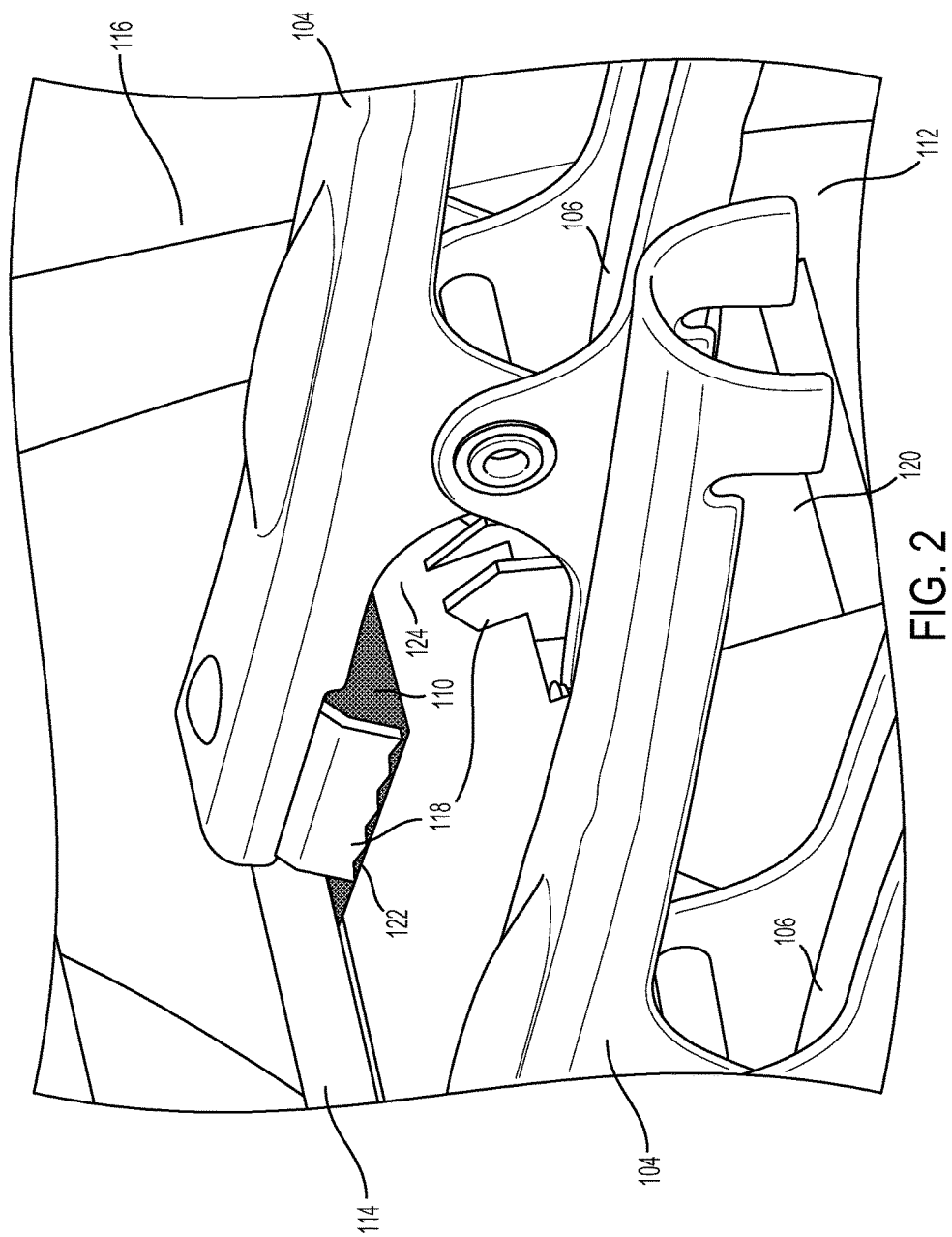
FIG. 2 illustrates an enlarged view of a battery clamp and cleaning device of FIG. 1 according to aspects of the application.
Figure 3:
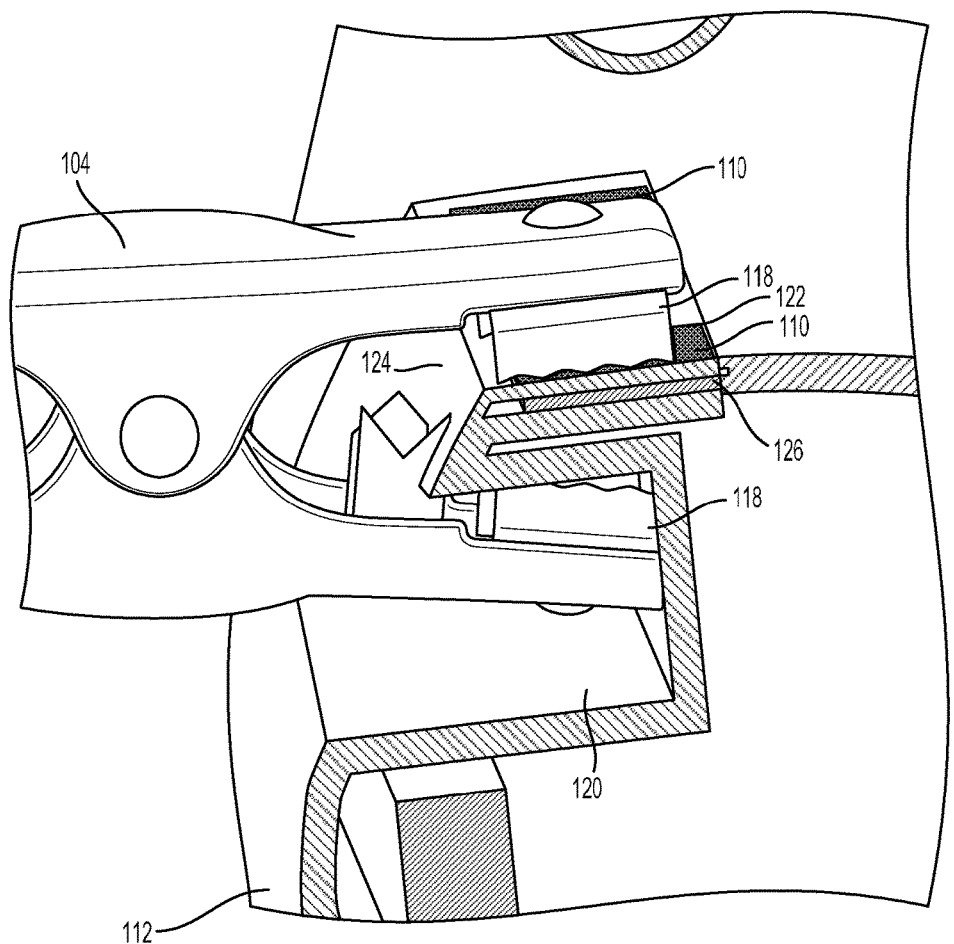
FIG. 3 illustrates an enlarged sectional perspective view of the battery clamp and cleaning device of FIG. 1 according to aspects of the application.
Figure 4:
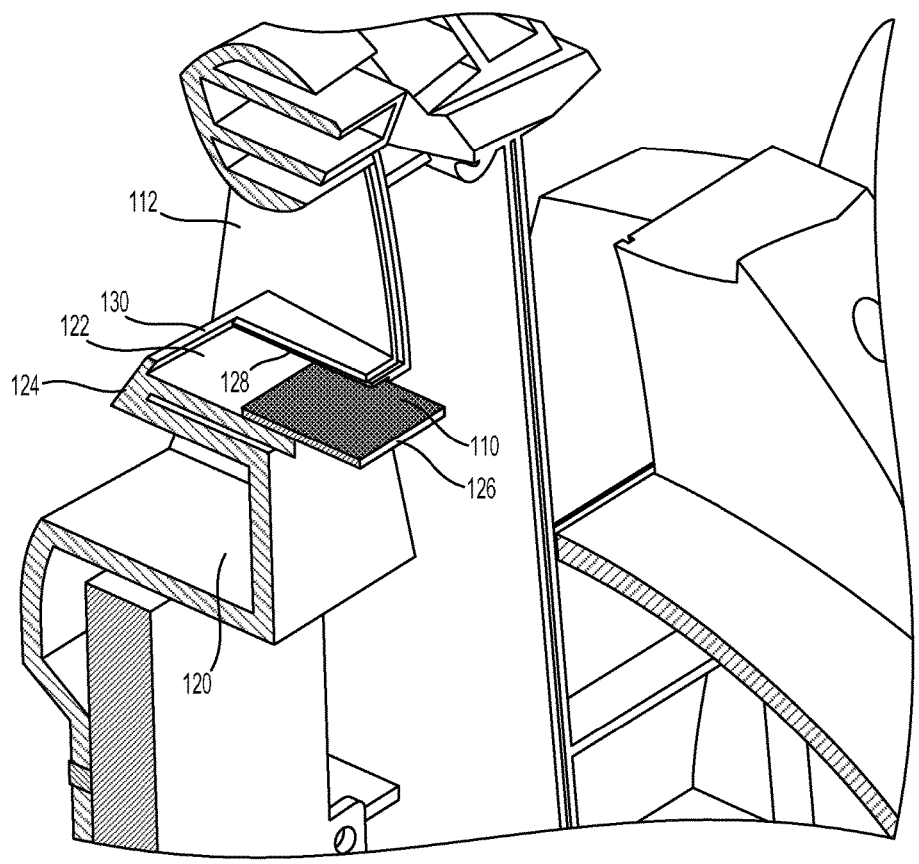
FIG. 4 illustrates an enlarged sectional perspective view of a first housing portion of the battery pack of FIG. 1 according to aspects of the application.
Figure 5:
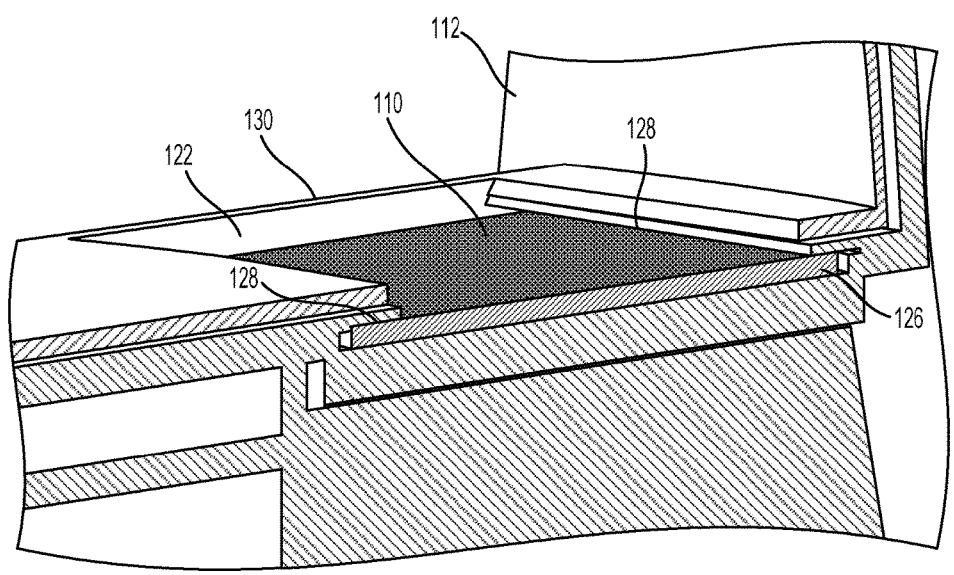
FIG. 5 illustrates another enlarged sectional perspective view of the first housing portion of the battery pack of FIG. 1 according to aspects of the application.

Referring to FIGS. 3-5, abrasive surfaces 110 are disposed on the storage area 108 and may be provided as all or a part of an abrasive material 126 disposed in the recesses 122. An abrasive material 126 may also be disposed on an upper portion of the recesses 124 where the lower jaws 118 of the corresponding battery clamps 104 are disposed. As illustrated in FIGS. 4 and 5, sides of the abrasive material 126 may be held in place by grooves 128 formed in the recesses 122 in the first housing portion 112. A front of the abrasive material 126 may be held in place by an angled front lip 130 formed by the recesses 122. A rear of the abrasive material 126 may also be held in place by the second housing portion 114, when the second housing portion 114 is coupled to the first housing portion 112 (for example, as illustrated in FIG. 2).

During assembly, the abrasive material 126 may be slid into place (i.e., into the grooves 128 of recesses 122) in the first housing portion 112. Thereafter, the second housing portion 114 may be coupled to the first housing portion 112. Once the second housing portion 114 is coupled to the first housing portion 112, the abrasive material 126 may be held in place on all sides to prevent the abrasive material 126 from falling out of or accidentally being removed from the recesses 122.

The abrasive surface 110 and/or material 126 interfaces with and assists in frictionally cleaning the corresponding jaws 118 of the battery clamps 104. The abrasive surface 110 and/or material 126 allows corrosion, dirt, and other debris and deposits to be removed from the jaws 118 to provide a clean surface or connection between the battery clamps 104 and a corresponding battery onto which the battery clamps 104 are disposed. This cleaning effect aids in preventing a reduction in the flow of current between the battery clamps 104 and the terminals of the battery onto which the battery clamps 104 are disposed. To clean the jaws 118 of the battery clamps 104, a user may scrape the jaws 118 of the battery clamps 104 on the abrasive surface 110 and/or material 126 one or more times simply by pulling the battery clamps off of the housing 102 when the battery clamps 104 are coupled to the housing 102. This may be repeated to further clean the jaws 118 as needed.

As described above, the abrasive surface 110 may be all or part of the abrasive material 126. Alternatively, the abrasive surface 110 may be formed in the housing 102 by scoring or otherwise roughening the surface of the recesses 122 to form the abrasive surface 110. The abrasive material 126 may be any type of material that provides a roughened surface, such as, but not limited to, mineral and/or synthetic stone bonded or coated materials. In an example, one or more minerals and/or synthetic stones may be coated on a backing material, such as paper, cloth, rubber, resin, polyester, metal or backing material. In another example, one or more minerals and/or synthetic stones may be contained within a matrix or binder, such as clay, resin, glass, rubber, or other binder material.

The abrasive material 126 may be permanently disposed or deposited, or may be replaceable. In one respect, the housing 102 may be configured to be decoupled, for example, by separating the first housing portion 112 and the second housing portion 114 from one another, or removing a portion of one of the first and second housing portions 112, 114 to allow access to the abrasive material 126. This allows for the removal and replacement of the abrasive material 126.

Referring again to FIG. 1, the housing 102 may include a handle 132 that a user may grip to easily transport the battery pack unit 100. The housing may also include a charging port having a cover 134. The charging port may allow a user to couple the battery pack unit 100 to an external power supply (via a charger accessory) to charge the electrical source of the battery pack unit 100 and/or supply current through the battery pack unit 100 to a battery electrically coupled to the battery clamps 104.

Figure 6:
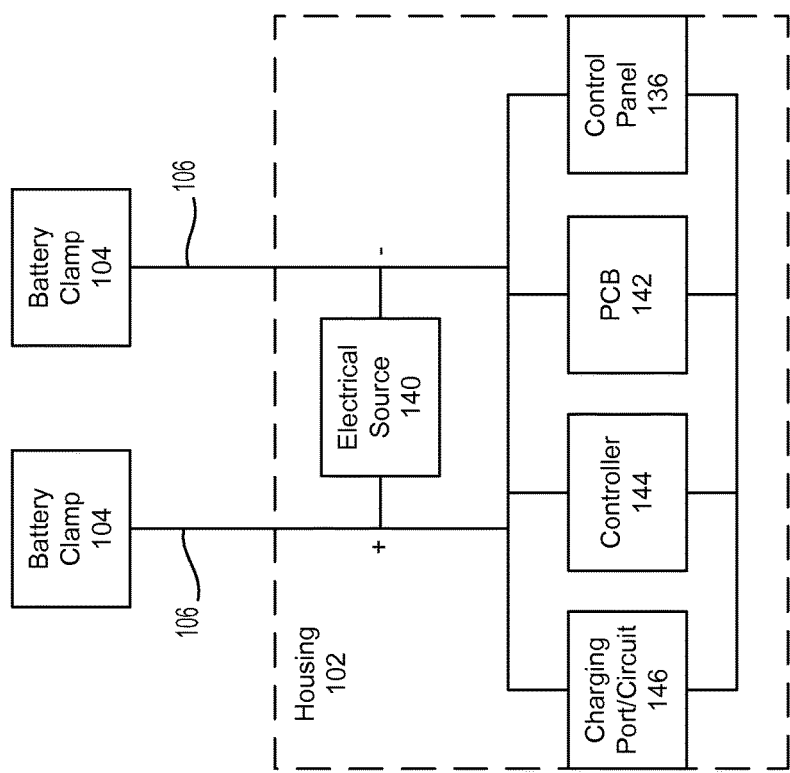
FIG. 6 illustrates a functional block diagram of internal components of the battery packs according to aspects of the application.

Referring to FIGS. 1 and 6, the battery pack unit 100 may also include a control panel 136 including buttons and a display 138 to allow a user to operate the battery pack unit 100 to charge and/or jump start a battery/vehicle. As described above, a number of components may be housed in the housing 102, as known in the art to provide the functionality of the battery pack unit 100. For example, referring to FIG. 6, one or more of an electrical source 140, PCB 142, processor/controller 144, charging port/circuit 146, control panel 136, and other circuit components such as resistors and capacitors may be housed by the housing 102.

The electrical source 140 may be a battery, a capacitor, an ultra-capacitor, or other type of electrical energy source. The positive and negative terminals of the electrical source 140 are electrically coupled to the corresponding battery clamps 104 via cables 106. The electrical source 140 may also be operably coupled with the circuit board 142, processor/controller 144, charging port/circuit 146, control panel 136, and other circuit components.

The various components may be electrically coupled to each other via the circuit board 142. For example, the controller 144 may be part of or coupled to the circuit board 142 and include and control activation and deactivation of one or more alarms, indicators (such as lights or light emitting diodes, audible sounds, etc.), and/or the control panel 136. These alarms, indicators, and/or the control panel 136 may provide information to the user, such as, the current state of charge of the battery of the vehicle, the indication of the electrical source 140 falling below a threshold voltage, etc. The controller 144 may also include a timer and/or monitor a state-of-charge of a battery coupled to the battery clamps 106.

The charging port/circuit 146 may provide a means of safely charging the electrical source 140, and protect the components and circuitry of the battery pack unit 100 from voltage spikes. The charging port/circuit 146 may be coupled to and receive a charging voltage from an external power supply, such as a wall-mounted type outlet or a 12 volt type port of a corresponding vehicle.

The battery pack unit 100 may also provide for varying amps or volts of current flow or charge to be supplied to the battery clamps 104, which may be selected by the user through the control panel 136. This allows the user to select the appropriate amount of amps or volts for jump starting or charging a variety of different types of batteries with the battery pack unit 100.

While the battery pack unit 100 is described above as having the storage area 108 including the one or more abrasive surfaces 110, such abrasive surfaces 110 may be incorporated into any other type of location or storage area for placing battery clamps. For example, the abrasive surfaces 110 may be incorporated into studs, posts or other areas where battery clamps are stored or clamped as part of battery chargers and battery jump packs.

Figure 7:
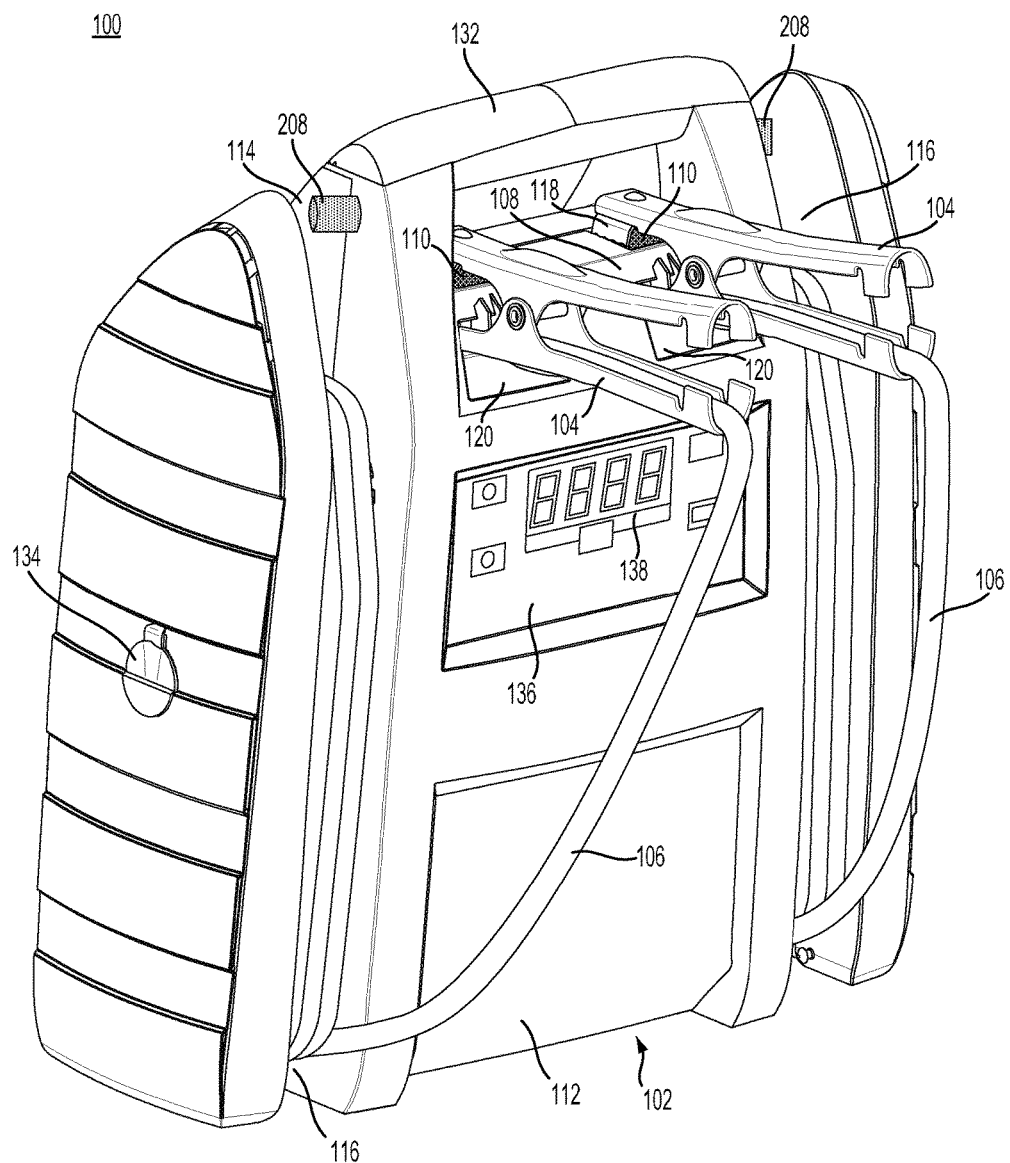
FIG. 7 illustrates a perspective view of another battery pack according to aspects of the application.

Referring to FIG. 7, in an embodiment, the battery pack unit 100 may include battery clamp posts 208 that include abrasive surfaces, are coated in an abrasive, or are formed of an abrasive material, similar to the abrasive surface 110/material 126 described above. The battery clamp posts 208 may be included in addition to or in an alternative to the abrasive surface 110/material 126. The posts 208 may provide a location onto which the battery clamps 104 may be clamped for storage. Additionally, the posts 208 may be used to clean the jaws 118 of the battery clamps 104, for example, by a user clamping the battery clamps 104 onto the corresponding posts 208 and rotating or otherwise scraping the jaws 118 of the battery clamps 104 on the posts 208.

The manner set forth in the foregoing description and accompanying drawings and examples, is offered by way of illustration only and not as a limitation. More particular embodiments have been shown and described, and it will be apparent to those skilled in the art that changes and modifications may be made without departing from the broader aspects of the application. The actual scope of the protection sought is intended to be defined in the following claims when viewed in their proper prospective based on the prior art.

What is claimed is:

1. A battery pack unit having a battery clamp with upper and lower jaws, comprising:
    a housing;
    a storage structure formed in the housing that is adapted to receive the battery clamp for;
    a first recess formed in the storage structure that is adapted to receive at least one of the upper and lower jaws;
    an abrasive surface disposed in the first recess that is adapted to interface with the at least one of the upper and lower jaws when the battery clamp is disposed on the storage structure; and
    a groove formed in the first recess that is adapted to receive a side of the abrasive surface and retain the abrasive surface in the first recess.

2. The battery pack unit of claim 1, wherein the first recess is adapted to receive the upper jaw when the battery clamp is disposed on the storage structure.

3. The battery pack unit of claim 2, further comprising a second recess formed in the storage structure that is adapted to receive the lower jaw when the battery clamp is disposed on the storage structure.

4. The battery pack unit of claim 3, wherein the storage structure includes a lip formed by the first and second recesses, and wherein the battery clamp is clamped onto the lip when the battery clamp is disposed on the storage structure.

5. The battery pack unit of claim 2, wherein the abrasive surface is formed by an abrasive material disposed in the first recess.

6. The battery pack unit of claim 1, wherein the groove includes opposing first and second grooves that respectively receives first and second sides of the abrasive surface.

7. The battery pack unit of claim 1, further comprising an angled front lip formed in the first recess that is adapted to receive a front side of the abrasive surface and retain the abrasive surface in the first recess.

8. A battery pack unit, comprising:
    a housing;
    an electrical source disposed in the housing;
    a cable electrically coupled to a terminal of the electrical source and extending out of the housing;
    a battery clamp having upper and lower jaws, wherein the battery clamp is electrically coupled to the cable exterior to the housing;
    a storage structure formed on the housing and onto which the battery clamp is disposed for storage;
    a recess formed in the storage structure that is adapted to receive at least one of the upper and lower jaws
    an abrasive surface disposed in the recess and adapted to interface with the least one of the upper and lower jaws when the battery clamp is disposed on the storage structure; and
    a groove formed in the recess that is adapted to receive a side of the abrasive surface and retain the abrasive surface in the recess.

9. The battery pack unit of claim 8, wherein the recess is adapted to receive the upper jaw of the battery clamp when the battery clamp is disposed on the storage structure.

10. The battery pack unit of claim 9, wherein the abrasive surface is formed by an abrasive material disposed in the recess.

11. The battery pack unit of claim 8, further comprising an angled front lip formed in the recess that is adapted to receive a front side of the abrasive surface and retain the abrasive surface in the recess.

12. The battery pack unit of claim 8, wherein the housing includes a cable groove configured to receive the cable for storage.

13. The batter pack unit of claim 8, wherein the electrical source is a battery or capacitor.

14. A battery pack unit, comprising:
- a housing;
- an electrical source disposed in the housing;
- a first cable electrically coupled to a first terminal of the electrical source and extending out of the housing;
- a first battery clamp having first battery clamp upper and lower jaws, wherein the first battery clamp is electrically coupled to the first cable exterior to the housing;
- a second cable electrically coupled to a second terminal of the electrical source and extending out of the housing;
- a second battery clamp having second battery clamp upper and lower jaws, wherein the second battery clamp is electrically coupled to the second cable exterior to the housing;
- first and second storage structures formed on the housing;
- first and second recesses respectively formed in the first and second storage structures that are respectively adapted to receive the upper and lower jaws;
- first and second abrasive surfaces respectively disposed in the first and second recesses and respectively interfacing with at least one of the first and second battery clamp upper and lower jaws; and
- first and second grooves respectively formed in the first and second recess that are adapted to respectively receive a side of the respective first and second abrasive surfaces and retain the respective first and second abrasive surfaces.

15. The battery pack unit of claim 14, wherein the first abrasive surface is formed by a first abrasive material disposed in the first recess, and the second abrasive surface is formed by a second abrasive material disposed in the second recess.

\* \* \* \* \*